United States Patent
Balasubramanian et al.

(10) Patent No.: US 7,064,860 B1
(45) Date of Patent: Jun. 20, 2006

(54) COLOR-BALANCED TRC CORRECTION TO COMPENSATE FOR ILLUMINANT CHANGES IN PRINTER CHARACTERIZATION

(75) Inventors: Thyagarajan Balasubramanian, Webster, NY (US); Shen-Ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/571,125

(22) Filed: May 15, 2000

(51) Int. Cl.
*H04N 1/40* (2006.01)
(52) U.S. Cl. ........................ 358/1.9; 358/2.1
(58) Field of Classification Search ................ 358/1.9, 358/2.1, 3.02, 3.24, 518, 523, 3.233; 382/162–167
See application file for complete search history.

(56) References Cited

U.S. PATENT DOCUMENTS

| | | | |
|---|---|---|---|
| 4,660,082 A | 4/1987 | Tomohisa et al. ........... 358/163 |
| 5,084,758 A | 1/1992 | Danzuka et al. | |
| 5,347,369 A * | 9/1994 | Harrington .................. 358/401 |
| 5,363,318 A | 11/1994 | McCauley ............. 364/571.01 |
| 6,462,835 B1 * | 10/2002 | Loushin et al. .............. 358/1.9 |
| 6,483,607 B1 * | 11/2002 | Van de Capelle et al. ... 358/1.9 |
| 6,654,150 B1 * | 11/2003 | Rozzi ........................... 358/520 |
| 2004/0169871 A1 * | 9/2004 | Uroz et al. ................... 358/1.9 |

FOREIGN PATENT DOCUMENTS

EP 0 891 077 A 1/1999

OTHER PUBLICATIONS

R. Balasubramanian, "Optimization of the Spectral Neugebauer Model For Printer Characterization", Journal of Electronic Imaging 8(2), 156-166 (Apr. 1999).
R. Balasubramanian, Martin S. Maltz, "Refinement of Printer Transformations Using Weighted Regression", Proc. SPIE, vol. 2658, pp. 334-340, (1996).
Buckley R.R. et al., Invited Address: White-Point Transformations and Color Data Intercahnge:, SID International Symposium Digest of Papers, Boston, May 17-22, 1992, Playa Del Rey, Sid., U.S., vol. 23, pp. 560-563 XP000479085 ISSN: 0097-966X.
Naoya Katoh, "Practical Method for Appearance Match Between Soft Copy and Hard Copy", Proceedings of the SPIE, SPIE, Bellingham, VA, US, vol. 2170, Feb. 7, 1994, pp. 170-181, XP000579426 ISSN: 0277-786X.

* cited by examiner

*Primary Examiner*—Thomas D. Lee
*Assistant Examiner*—Stephen Brinich
(74) *Attorney, Agent, or Firm*—Fay, Sharpe, Fagan, Minnich & McKee, LLP

(57) ABSTRACT

A color marking device includes a color balance controller which adjusts the TRC linearization in accordance with an intended illuminant for viewing the output of the device. The system comprises a front end converter for converting an input signal representative of a target image comprised to preselect the color into a device dependent control system in accordance with the device TRC. The device TRC is selected in accordance with a signal identifying the intended illuminant for the output.

9 Claims, 2 Drawing Sheets

US 7,064,860 B1

COLOR-BALANCED TRC CORRECTION TO COMPENSATE FOR ILLUMINANT CHANGES IN PRINTER CHARACTERIZATION

FIELD OF THE INVENTION

The subject invention pertains to the art of color management and image/text printing or display systems, and is especially applicable to a method and apparatus wherein the system is adjusted for generating output intended to be viewed under a certain preselected illuminant. The Tone Reproduction Curve ("TRC") representing device operation is merely tuned by proper color balancing corresponding to the illuminant. More particularly, the invention relates to system controls for calibrating the device by simply monitoring and adjusting color balance (e.g. gray balance) for accuracy and by constructing corresponding TRC points to the color balancing. A full color correction can be accurately estimated from the accurate and controlled TRC points, whereby color calibrations and characterizations for different illuminants can be maintained with merely a static device profile for a default illuminant and TRC adjustment for other illuminants.

Color correction and/or control should not be confused with color registration systems and sensors for insuring that colors are positioned properly, printed accurately, superposed correctly and/or adjacent to one another.

BACKGROUND OF THE INVENTION

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on a printer from one day to another, from one week to the next, month after month. Users have become accustomed to printers and copiers that produce high quality color and gray-scaled output. Users now expect to be able to reproduce a color image with consistent quality on any compatible marking device, including another device within an organization, a device at home or a device used anywhere else in the world. There has been a long felt commercial need for efficiently maintaining print color predictability, particularly as electronic marketing has placed more importance on the accurate representation of merchandise in illustrative print or display media. If a user is aware of the intended illuminant (daylight, tungsten, florescent, etc.) for a certain output, color accuracy can be improved if the device is tuned for that illuminant.

Description of color, color perception and psychological and physiological phenomena involving light, object and observer, including color measurements using spectrophotometers are described in R. W. G. Hunt, "The Reproduction of Color in Photography, Printing and Television". Fourth Edition, Fountain Press, Tolworth, England 1987 ISBN 0-8524-2356. It is well known that human perception of color identity can vary with illuminants.

The models presented in this specification use a device independent color space to consistently track a set of target colors. L*, a*, b* are the CIE (Commission Internationale de L'éclairage) color standards utilized in the modeling. L* defines lightness, a* corresponds to the red/green value and b* denotes the amount of yellow/blue, which corresponds to the way people perceive color. A neutral color is a color where $a^*=b^*=0$.

Conventional calibration and characterization of a four-color (cyan, magenta, yellow and black) printer or copier involves at least the following processes: (1) generating a 3-D look-up table (LUT) for mapping device independent parameter space to CMY (cyan-magenta-yellow) space; (2) executing a GCR (gray component replacement)/UCR (under color removal) strategy to convert the CMY space parameters to CMYK space parameters which represent the colors of a typical four-color marking device; (3) constructing marking device TRCs (tone reproduction curves) to account for marking device variabilities (normally done at the time of manufacturing or whenever the printer calibration and characterization process is involved); and (4) applying a suitable half-toning strategy to convert the CMYK continuous tone description obtained after using the 3-D LUTs in steps 1 and 2 above and 1-D LUTs in step 3 above, to the image, to a binary description (e.g., bits to be received by a raster output scanner or similar device for outputting the image). The first two steps are generally regarded as part of the printer characterization. The third step is normally called calibration.

Previously known standard approaches for calibrating and characterizing a system for different illuminants comprised building different profiles, i.e., different LUTs and TRCs for different illuminants—a costly, time consuming and expensive endeavor. A large database of LUTs and TRCs compensating for different color correction for each different illuminant, can place prohibitive demands on system storage and increase the complexity of profile management.

The TRCs are stored plots of an input parameter value versus an output parameter value for a particular color. A TRC is a monotonically increasing marking device function in input-output contone space or input-output density space or input-output byte space, or combinations thereof. In other words, a TRC indicates the value of the output parameter for a specific device that must be used to reproduce the input parameter (if the input and output parameters are exactly equal, then the inputs and outputs are expressed in the same coordinate space). Inaccuracies in the TRC construction step can lead to inaccuracies in color balancing and the 3-D LUT.

Obtaining TRCs for a particular color marking engine is a calibration process, which can be constructed by printing predetermined target colors and measuring the printed target colors using a spectrophotometer or insitu color sensors. Predetermined target colors can be printed as a separate calibration sheet, or as chronological jobs in the banner sheet/header sheet or else the target colors can be extracted from the customer image and measured either by measuring straight from the output image or by rendering subsets of customer colors as target color patches in banner or header pages. Using the target colors and their measured counterparts, and by processing the measured colors, TRCs are adjusted on-line at some desired intervals or on request during system or color balance set ups.

One method of obtaining 1-D TRCs is associated with achieving neutral gray balance. Grayness is an indication of how accurate a process color is, compared to its theoretical ideal of zero chroma (that is, $a^*=0$, $b^*=0$). When equal amounts of cyan, magenta and yellow are printed on a white paper, a well balanced printer should produce a neutral gray of the same amount. Instead, other colors, such as a brownish color, rather than a neutral gray may regularly occur. The system will not produce the desired gray due to various limitations on color pigments of the primaries and the internal processes of the print engine. To overcome this effect, gray-balanced TRCs are used as one-dimensional LUTs to modulate the amount of cyan, magenta and yellow proportions depending on the state of the materials and the print engine. The TRCs are obtained by printing a number of patches, mostly near neutral. In the methods practiced by the color reproduction industry, colors are measured using offline spectrophotometers and amounts of cyan, magenta and yellow are then modified, generally, by using model based algorithms to produce the desired gray-balanced TRCs. Sometimes this process of printing and producing TRCs is iterated several times until satisfactory results are obtained.

The subject invention is particularly useful to provide solutions to the foregoing color problems for a wide range of color workflow practices. Printing and product enhancements are provided that would enable customers to manipulate color documents on a screen before even printing/displaying an output on different output devices in ways that improve the accuracy of the output when viewed under any of several illuminants.

The subject invention exploits a key enabling factor for these operational advantages by constructing the TRCs for individual primaries with implementation of a dynamic color balanced control system tuned for different illuminants for automatic calibration of a full color digital printing system.

BRIEF SUMMARY OF THE INVENTION

In accordance with the present invention, there is provided a system and method for characterizing a color marking device relative to a particular one of any of a plurality of different illuminants.

The system generates a three-dimensional look-up table (LUT) for mapping device independent parameter space to device parameter space such as CMYK (representing the colors of a typical four-color marking device). The LUT is generated with reference to a first or default illuminant, generally comprising the most common expected illuminant for system output. A first TRC is built for calibrating the system for accurate color output as viewed under the first illuminant. An adjusted characterization profile includes the single LUT with a second TRC calibrated for accurate color output as viewed under a second illuminant. Building a system profile from the first LUT and the second TRC for a second illuminant simply derives a color correction transformation for the system which is relative to a plurality of illuminants and places reduced demands on system storage for simplified profile management.

In accordance with another aspect of the present invention, the TRCs are built with primary reference to defining a set of controlled points accurately defined with reference to preselected target colors as viewed under a corresponding illuminant to the particular TRC.

In accordance with another illuminant aspect of the invention, the TRCs are built with controlled points thereon determined with reference to test target neutral colors.

In accordance with yet another aspect of the present invention, the test target neutral colors comprise neutral gray.

A principal advantage of the subject invention is an effective database capable of generating print output accurately calibrated to any of a plurality of illuminants comprising a singular LUT and a plurality of TRCs, each calibrated to a particular illuminant. The subject system places reduced demands on storage and simplifies profile management.

Another advantage of the subject invention is that a file can be separated to CMYK once, then repurposed for different illuminants by processing through the appropriate TRCs. This is a performance advantage, since the expensive 3-D correction is done only once.

Another benefit of the present invention is a provision of a printing system which substantially reduces the frequency requirements of full blown characterizations.

Other benefits and advantages for the subject new system will become apparent to those skilled in the art upon a reading and understanding of this specification.

BRIEF DESCRIPTION OF THE DRAWING

The invention may take physical form in certain parts and steps and arrangements of parts and steps, the preferred embodiments of which will be described in detail in the specification and illustrated in the accompanying drawings, which form a part hereof and wherein.

DESCRIPTION OF THE PREFERRED EMBODIMENTS

Figure 1:
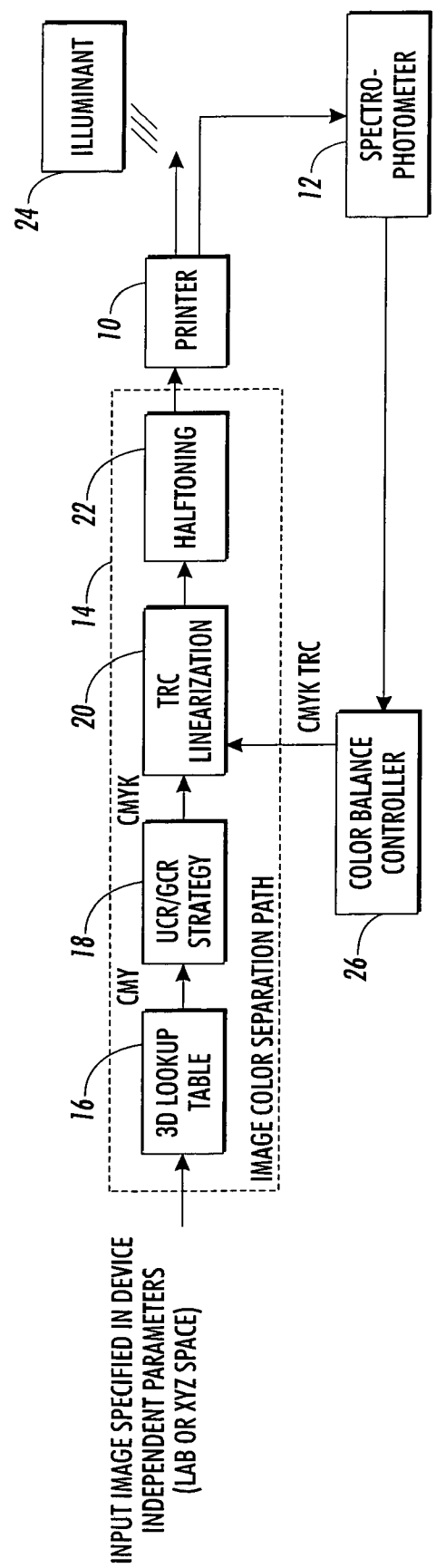
FIG. 1 is a schematic block diagram particularly illustrating a system implementation of the subject invention.

Referring now to the drawings wherein they are shown for purposes of illustrating the preferred embodiments of the invention only and not for purposes of limiting same, the Figures show a method and apparatus for characterizing and calibrating a digital printing system utilizing a limited dynamic color balance control system. The subject system compensates for an illuminant change by adjusting only the 1-D TRCs, rather than the entire 3-D correction. This will significantly reduce the storage requirements and complexity of the profile database. Furthermore, files can be separated to CMYK once, then repurposed for different illuminants by processing through the appropriate TRCs. This is a performance advantage, since the expensive 3-D correction (which is often part of the even more costly PDL-to-Raster conversion) is done only once. It is an important feature of the present invention that the TRCs, should be colored-balanced (e.g., gray-balanced) for the given illuminants. When C=M=Y is passed on to TRCs and printed, the resultant colors should be neutral under the given illuminant.

More particularly, and with reference to FIG. 1, a block diagram representation of the overall system of the subject invention is depicted. The printer specified in the system comprises a conventional color-marking device 10, although the invention is not restricted to marking devices alone and any image reproducing/displaying system, such as printers, monitors or other imagining devices are intentionally included. A color sensing device 12, such as a spectrophotometer or calorimeter is employed to provide spectral information comprising a representative signal of the printed colors of the image and preferably comprises L*, a*, b* values for given illuminants, although other conventional representative schemes may be employed.

The digital front end (DFE) 14 of the system comprises a conventional image color separation path for processing an input image as specified in device independent parameters into CMYK printing parameters acceptable by the printer 10. A 3-D LUT 16 transforms the original image in device independent space to CMY space. The CMY space is transformed to CMYK space by undercolor removal/gray component replacement 18. Linearization of the Tone Reproduction Curve (TRC) 20 comprises a calibration and characterization process which is the subject of the present application. The particular linearized signal resulting from the TRC is converted into a halftone imaging before actual printing by the marking device 10.

The color imaging of the output of the printer is detected under a particular illuminant 24, which illuminant is identified to a Color Balance Controller 26 for corresponding adjustment of a set of 1-D TRCs for TRC linearization 20.

As noted above, it has been observed that as the viewing illuminant varies, the substantial changes in the appearance of an output print are in the neutral region of color space. Color correction along the neutral axis (i.e., gray-balancing) can be performed to a large degree by 1-D TRCs. (See H. R. Kang, Color Technology For Electronic Imaging Devices, SPIE 1997.) That is the C, M and Y, TRCs are derived so that equal amounts of C, M and Y are mapped to relative amounts of area coverage that yield neutral colors.

The subject invention exploits these observations to compensate for changes in illuminants with a first order adjustment by simply rederiving the gray-balanced TRCs for each illuminant, while performing the 3-D part of the color correction with a single 3-D LUT. This will significantly reduce the storage requirements and the complexity of managing a profile database. For example, a 16×16×16 LUT requires 16 K bytes of storage, while a set of 8 bit CMYK TRCs requires 1 KB. If the system had to support N illuminants, the conventional approach would require 17N Kbytes, while the proposed method would require 16+N Kbytes. If N=4, the subject invention requires 30% of the disk space required by the prior known system. As the number of variables in the system increases (e.g., different halftones, media, rendering intents, etc.), the savings afforded by simple TRC correction becomes even more substantial.

Conventional interpolation techniques are used to construct the intermediate uncontrolled points from the measured controlled points on the TRC.

A particular advantage of the subject invention is that a file can be separated to CMYK once, then repurposed for different illuminants by processing through the appropriate TRCs. This is a performance advantage, since the expensive 3-D correction is done only once.

To test the approach proposed in this invention, a printer characterization experiment was conducted with a digital Majestik color printer. First, a Lab-to-CMYK 3-D LUT and four gray-balancing 1-D TRCs were derived using a standard printer calibration routine. The illuminant applied was a standard CIE D50 illumination. Separately, the same calibration procedure was conducted again for the standard CIE A illumination. Since the two spectrums, D50 and A illuminations, have significantly different shapes, the difference of two calibration results can be clearly seen from both pictorial samples and color measurement results. To make a quantitative comparison, for each characterization approach, shown in Table 1, 2316 Check-Error color patches were created, based on the calibration result, and measured under the desired illumination. The desired CIE Lab values are compared with the measurement result and the average delta Es (representative error value), as well as the maximum delta Es, are listed. In Table 1, the first two rows, 1 and 2, show the results of two independent calibrations and characterizations for D50 and A illuminants, respectively. Two cross-tests, row 3 and 4, show the results when the illumination used for calibration and characterization and the illumination used for measurement are mismatched. The last row of Table 1 illustrates the result based on the subject invention: a 3-D LUT, initially characterized for the D50 illuminant, is followed by a set of gray-balanced TRCs calibrated for the A illumination. The reproduction from this color correction is then compared against desired CIELAB values under illuminant A. As shown by this experiment, the proposed combination yields a result very close to the one with a full calibration and characterization for the illuminant A.

TABLE 1

| | CIE Lab-CMYK 3-D LUT Characterized for Illuminant | CMYK 1-D TRCs Calibrated for Illuminant | Corresponding 216 Check-Error Color Patches Measured Under Illumination | Average Delta E | Maximal Delta E |
|---|---|---|---|---|---|
| 1 | D50 | D50 | D50 | 4.4 | 11.8 |
| 2 | A | A | A | 4.4 | 13.8 |
| 3 | D50 | D50 | A | 10.3 | 24.9 |
| 4 | A | A | D50 | 8.4 | 18.8 |
| 5 | D50 | A | A | 5.0 | 14.1 |

Figure 2:
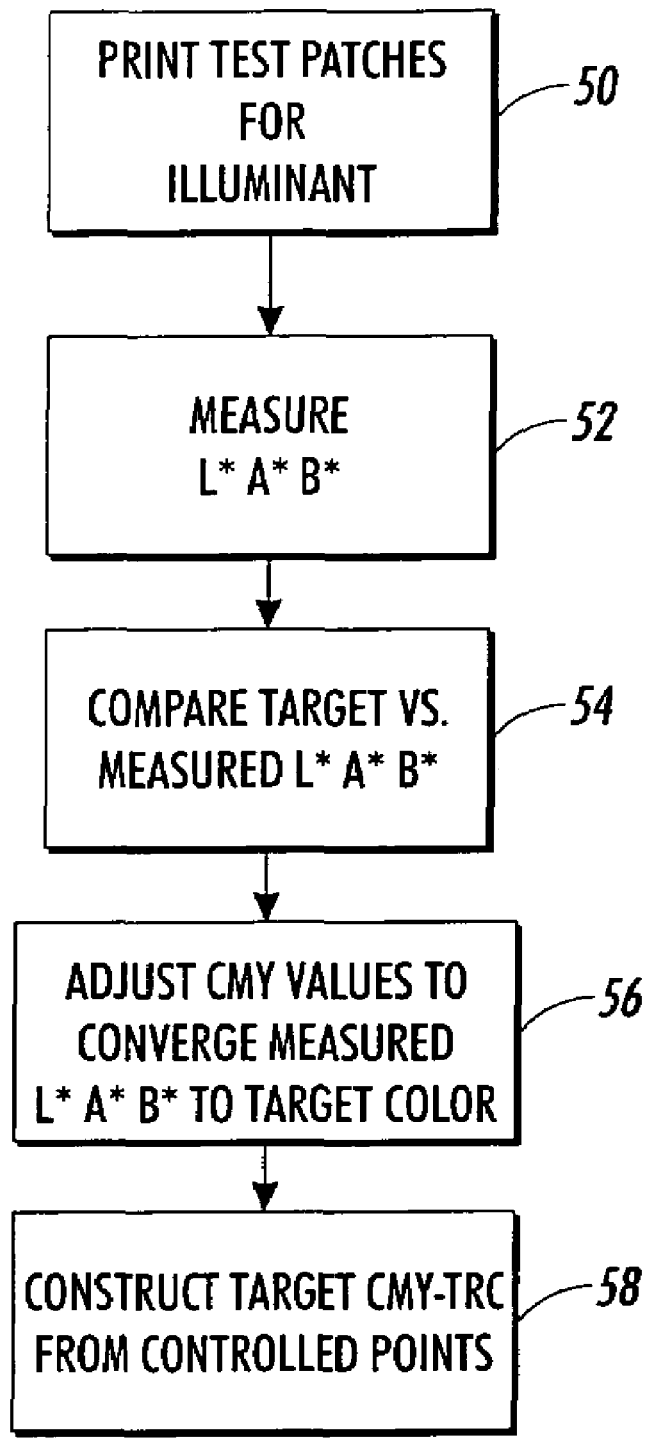
FIG. 2 is a flowchart illustrating steps in constructing a TRC calibrated to a particular illuminant and may be implemented with the subject invention.

With particular reference to FIG. 2, a flowchart for the construction of illuminant adjusted TRCs is illustrated. (A control system that could be employed for implementation of appropriate TRC construction is disclosed in co-pending Xerox Ser. No. 09/566,291, L. K. Mestha et al.) Output test patches are printed 50, their color identity 52 is measured for a given illuminant with sensing device 12 and compared 54 versus the target L*, a*, b* values. The CMY values are adjusted 56 to converge the measured L*, a*, b* values to a target color. The control points identified from the conversion can then be used to construct an appropriate target CMY-TRC for the given illuminant.

The invention has been described with reference to the preferred embodiment. Obviously, modifications and alterations will occur to others upon a reading and understanding of the specification. It is our intention to include all such modifications and alterations insofar as they come within the scope of the appended claims or the equivalents thereof.

We claim:

1. A method for selectively characterizing a color marking device relative to a plurality of viewing illuminants for enhanced output image accuracy when illuminated by a predetermined one of the plurality, the method comprising steps of:

building a device transformation profile for mapping a device independent color description signal to a device dependent color description signal, wherein the profile includes a multi-dimensional look-up table (LUT) and a first set of tone reproduction curves (TRCs), and wherein the first set of TRCs is calibrated for a first selected viewing illuminant comprising a selected light source for illuminated viewing of an output image generated by the color marking device;

building a second set of TRCs characterized for a second viewing illuminant; and, responsive to a user instruction for outputting an image intended for illumination by the second viewing illuminant, adjusting the transformation profile to effect transforming an input color representation signal of the image with the LUT and the second set of TRCs.

2. The method as defined in claim 1 wherein the building the second set of TRCs comprises defining controlled points of the second set of TRCs corresponding to neutral colors.

3. The method as defined in claim 2 wherein the defining controlled points comprises gray balancing the device for different viewing illuminants.

4. The method as defined in claim 1 wherein building the second set of TRCs comprises building a plurality of TRC sets, each corresponding to a different viewing illuminant.

5. The method as defined in claim 2 wherein the building the second set of TRCs comprises interpolating uncontrolled points of the second set of TRCs from the controlled points.

6. A system for characterizing a color marking device relative to a selected viewing illuminant for system output, wherein the viewing illuminant comprises an intended light source for illuminated viewing of a system output image generated by the color marking device comprising:

a profile including a LUT and a first set of TRCs calibrated for accurate color output as viewed under a first viewing illuminant; and, an adjusted profile including the LUT and a second set of TRCs calibrated for accurate color output as viewed under a second viewing illuminant whereby system characterization for deriving a color correction transformation relative to a plurality of viewing illuminants places reduced demands on system storage for simplified profile management.

7. The system as defined in claim 6 wherein the first and second sets of TRCs comprise a plurality of controlled points generated with reference to a neutral color.

8. The system as defined in claim 7 wherein the neutral color comprises a gray.

9. The system as defined in claim 8 wherein the system comprises a plurality of TRC sets, each corresponding to a different viewing illuminant.

* * * * *